United States Patent
Makinen et al.

[15] 3,666,314
[45] May 30, 1972

[54] TWO-WAY FOLDING SEAT BACK

[72] Inventors: John P. Makinen, Royal Oak; Gary A. Wize, Clair Shores, both of Mich.

[73] Assignee: General Motors Corporation, Detroit, Mich.

[22] Filed: Dec. 7, 1970

[21] Appl. No.: 95,712

[52] U.S. Cl. .................................296/66, 296/65 R, 297/379
[51] Int. Cl. ..........................................B60n 1/10
[58] Field of Search ...............296/65 R, 66, 69; 297/63, 64, 297/378, 379

[56] References Cited

UNITED STATES PATENTS

| | | |
|---|---|---|
| 2,627,894 | 2/1953 | Herider et al.........................296/64 |
| 2,955,644 | 10/1960 | Kramer.............................297/378 X |
| 3,292,970 | 12/1966 | Wilson................................296/66 |
| 3,408,103 | 10/1968 | Hewitt................................296/66 |

Primary Examiner—Benjamin Hersh
Assistant Examiner—Leslie J. Paperner
Attorney—J. L. Carpenter and E. J. Biskup

[57] ABSTRACT

A seat assembly including a seat back and a seat cushion wherein the seat back is adapted to be folded forwardly about a first axis extending transversely to the longitudinal axis of the vehicle so as to overlie the seat cushion and provide a flat cargo platform and adapted to be folded forwardly relative to the seat cushion about a second axis which is angularly related to and intersects the first axis at a point located adjacent the aforementioned longitudinal axis so as to provide access space for a passenger entering the rear of the vehicle.

3 Claims, 6 Drawing Figures

PATENTED MAY 30 1972

INVENTORS
John P. Makinen &
BY Gary A. Wize

E. J. Biskup
ATTORNEY

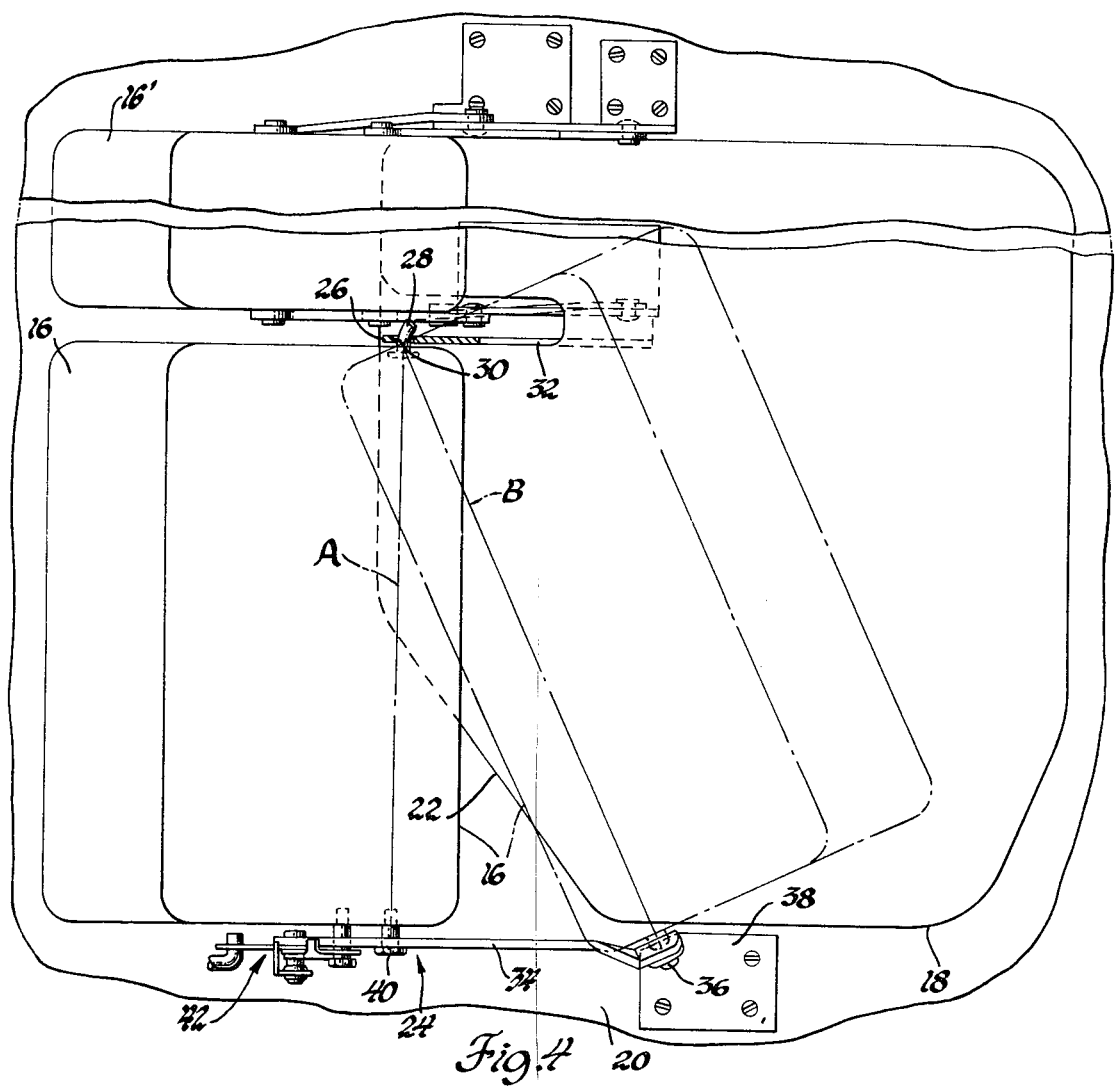
Fig. 4
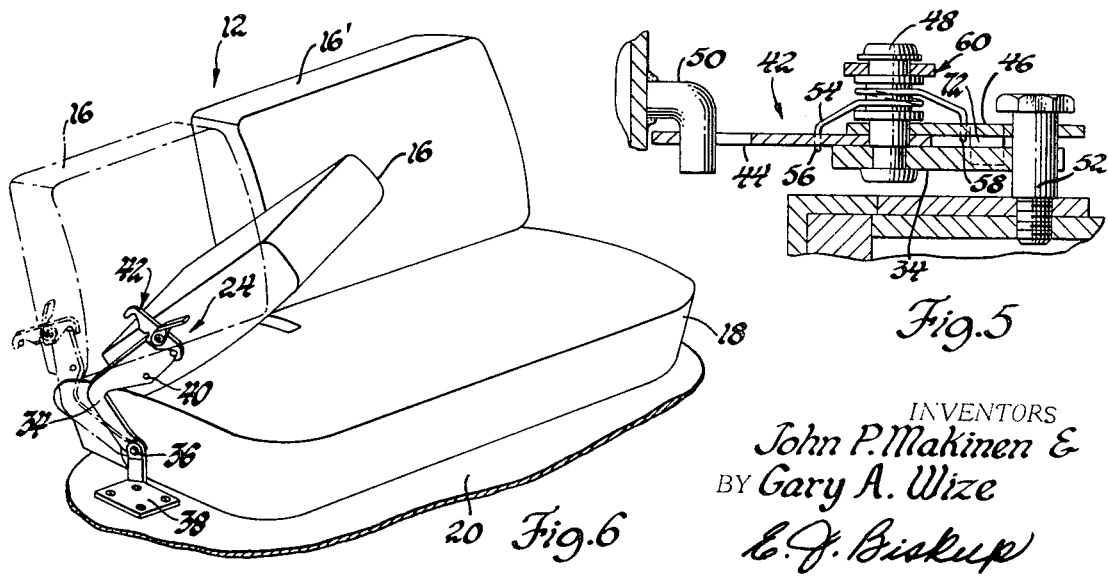
Fig. 5
Fig. 6
INVENTORS
John P. Makinen &
BY Gary A. Wize
E.J. Biskup
ATTORNEY

TWO-WAY FOLDING SEAT BACK

The present invention concerns a vehicle seat assembly of the type in which the seat back is mounted to the seat cushion through a latch and hinge arm arrangement which selectively permits the seat back to be folded forwardly about a pair of transversely extending and angularly related axes. When the seat back is folded about one of the axes, the outboard upper corner of the seat back moves forwardly and inwardly so as to provide sufficient clearance for a passenger that is either entering or leaving the rear of the vehicle. When the seat back is folded about the other of the axes, both the inboard and outboard upper corners of the seat back rotate together along a prescribed arc into an overlying position above the seat cushion and permit the back surface of the seat back to serve as cargo area.

In the preferred form, the seat assembly made according to the invention has the lower inboard corner of the seat back connected by a swivel joint to the vehicle. A hinge arm is located adjacent the outboard side of the seat back and has its lower end pivotally connected to the vehicle below and forwardly of the aforementioned swivel joint. The hinge arm extends rearwardly and upwardly for pivotal connection with the seat back along a transverse horizontal axis which intersects the center of the swivel joint and is substantially perpendicular to the longitudinal axis of the vehicle. The aforesaid transverse horizontal axis serves as one of the axes about which the seat back is foldable forwardly while an axis passing through the lower pivotal connection of the hinge arm and through the center of the swivel joint establishes the second axis about which the seat back is foldable. In order to obtain selective movement of the seat back about the two axes, the upper end of the hinge arm is provided with a latch mechanism which normally locks the upper end of the hinge arm between the vehicle and seat back. The latch mechanism includes a pair of hook members which cooperate with pin means rigidly secured to the seat back and the vehicle. A suitable actuator is provided, the movement of which in one direction causes the seat back to be released from locking engagement with the upper end of the hinge arm and permits the seat back to be folded forwardly about the transverse horizontal axis into a floor forming position over the seat cushion. Movement of the actuator in the opposite direction permits the outboard corner of the seat back to be swung about the second axis toward the center of the vehicle so as to provide access space for a passenger entering the rear of the vehicle.

The objects of the present invention are to provide a seat assembly in which the seat back is foldable forwardly about a pair of transversely extending and angularly related axes so as to permit the seat back to selectively assume a flat floor forming position overlying the seat cushion and a forwardly tilted position which provides access space for passengers entering the rear of the vehicle; to provide a seat assembly supported by a hinge arm arrangement that includes a latch mechanism permitting the seat back to be selectively moved forwardly about a pair of intersecting and transversely extending axes; to provide a latch mechanism that normally locks the upper part of a hinge arm to a seat back and permits the latter to be released from a locked state with the hinge arm so that the seat back can be folded forwardly to an overlying position above the seat cushion; and to provide a linkage arrangement for a seat back that includes a hinge arm, the upper end of which carries a latch mechanism adapted to unlock and lock the upper end of the hinge arm to the seat back so the latter will selectively pivot forwardly about first and second transversely extending and angularly related axes.

Other objects, features, and advantages of the present invention will be more apparent from the following detailed description when taken with the drawings in which:

FIG. 4 is a plan view of the seat assembly of FIG. 2;

FIG. 5 is a view taken on line 5—5 of FIG. 3; and

FIG. 6 is a perspective view of the center seat assembly shown in FIGS. 1, 2 and 4.

Figure 1:
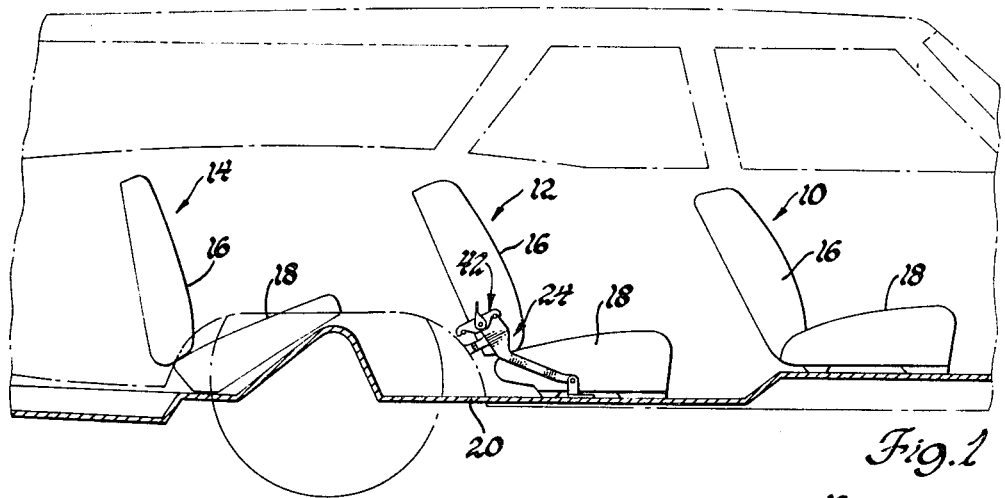
FIG. 1 is an elevational view of the passenger compartment of a three-seat station wagon in which the center seat assembly is made in accordance with the present invention.

Referring to the drawings and more particularly FIG. 1, a station wagon type vehicle is shown in which the passenger compartment includes a front seat assembly 10, an intermediate or center seat assembly 12, and a rear seat assembly 14, all of which include a seat back 16 and a seat cushion 18 arranged so that the seat occupant can face the forward end of the vehicle which is located to the right of the drawing sheet. As is usually the case, both the center seat assembly 12 and the rear seat assembly 14 are constructed in a manner so as to permit the seat back 16 to be folded into a position that causes the rear portion of the passenger compartment to have a flat floor and thereby function for a secondary purpose, namely, carrying cargo and large bulky objects which may be placed within the vehicle through a tailgate opening provided at the rear of the vehicle.

Although not shown, doors are normally provided on the opposite sides of the vehicle adjacent the center seat assembly 12 and the front seat assembly 10. The door usually located alongside the center seat assembly 12 provides access to the latter-mentioned seat as well as to the rear seat assembly 14. In this regard, it will be apparent that in order for a passenger to gain access to the rear seat assembly 14, the seat back 16 of the center seat assembly 12 must be moved forwardly and preferably about an axis which permits the upper outboard corner of the seat back to move toward the center of the vehicle. The center seat assembly 12 made according to the present invention is capable of realizing such movement as well as permitting the seat back 16 to move to a floor forming position, both movements being obtained through a unique support linkage which will now be described.

As seen in FIGS. 4 and 6, the seat cushion 18 of seat assembly 12 is of the bench type with the lower end thereof secured to the vehicle floor 20. Also, the rear outboard corner of the seat cushion 18 is eliminated so as to leave an angled vertically orientated wall 22 that is spaced from the vehicle side wall (not shown). A pair of upstanding seat backs 16 and 16' are positioned adjacent the rear edge of the seat cushion 18, and seat back 16 is connected to the vehicle basically by a hinge arm assembly 24 located at the outboard side of the seat back 16 and a swivel joint 26 located at the inboard side of the seat back 16.

More specifically, the swivel joint 26 comprises a curved pin 28, one end of which is rigidly secured to the lower inboard side of the seat back 16 while the other end of the pin 28 extends through a round hole 30 located in a bracket 32 which is rigid with the vehicle floor 20. The hinge arm assembly 24, supporting the outboard side of the seat back 16, comprises a hinge arm 34, the lower end of which is connected by a pivotal connection 36 to a bracket 38 secured to the vehicle floor 20. From the pivotal connection 36, the hinge arm 34 extends rearwardly and upwardly and is connected by a pivotal connection 40 to the seat back 16 adjacent the lower outboard corner thereof. At this juncture, it will be noted that as seen in FIG. 4, a straight line connecting the centers of pivotal connection 40 and the center of swivel joint 26 defines a horizontal pivot axis A which extends transversely to the longitudinal axis of the vehicle and is substantially perpendicular thereto. Also, a straight line passing through the center of pivotal connection 36 and the center of the swivel joint 26 defines a transverse pivot axis B which intersects the axis A and is angularly spaced therefrom. As should be apparent and as seen in FIGS. 2 and 6, the axis B is inclined upwardly from pivotal connection 36 as it extends toward the swivel joint 26.

Figure 3:
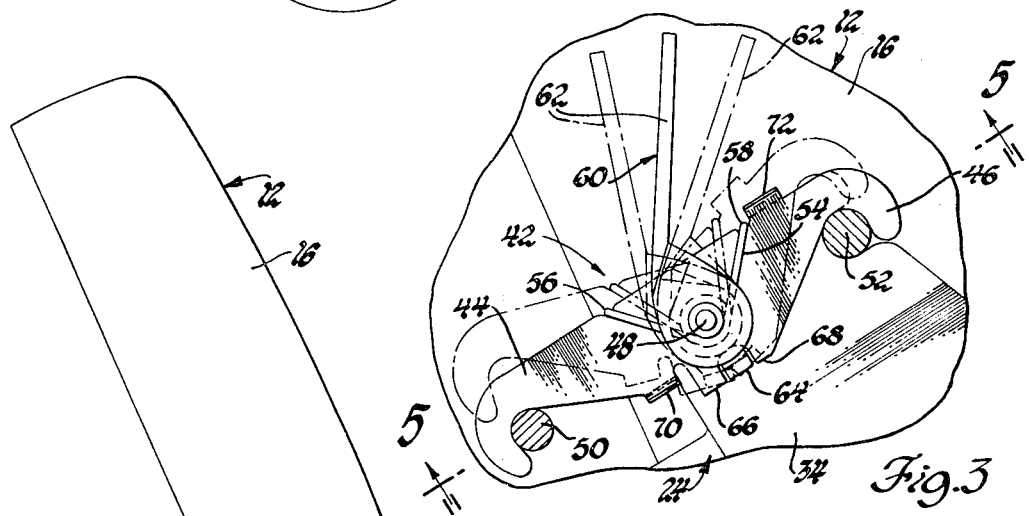
FIG. 3 is an enlarged view of the latch mechanism incorporated with the seat assembly of FIG. 2.
Figure 2:
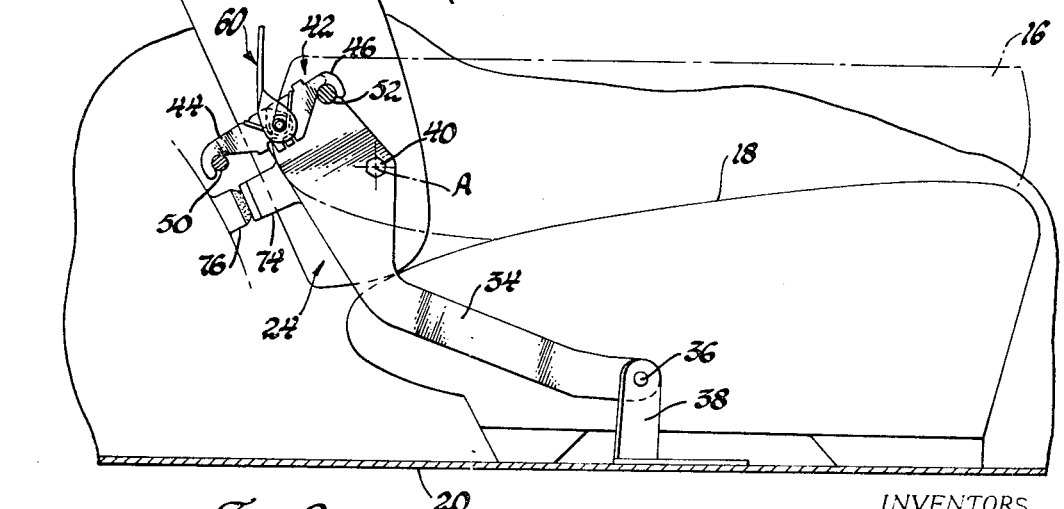
FIG. 2 is an enlarged elevational view of the center seat assembly shown in the station wagon of FIG. 1.

As seen in FIGS. 2 and 3, the upper end of the hinge arm 34 is provided with a latch mechanism 42 that includes a pair of hook members 44 and 46 connected to the hinge arm 34 by a common pivotal connection provided by a transverse pivot pin 48 seen in FIG. 5. The hook members 44 and 46 are adapted to cooperate with lock pins 50 and 52, respectively secured to the outboard side of the seat back 16 and to the vehicle. Thus, as seen in FIGS. 2 and 3, the hook member 46 engages lock pin 52 and serves to lock the upper end of the hinge arm 34 to the seat back 16. At the same time, hook member 44 engages lock pin 50 and serves to lock the upper end of the hinge arm 34 to the vehicle. As a result, the seat back 16 is locked in the full line position shown in FIG. 2.

Both hook members 44 and 46 are normally maintained in the full line positions shown in FIG. 3 by a torsion spring 54. As seen in FIGS. 3 and 5, an intermediate portion of the torsion spring 54 is wound about the pivot pin 48, while opposed end arms 56 and 58 of the torsion spring are located in notches formed in the hook members 44 and 46, respectively. The torsion spring 54 serves to bias hook member 46 in a clockwise direction about pivot pin 48 and biases the hook member 44 in a counterclockwise direction about the same pivot pin. For purposes of releasing the hook members 44 and 46 from engagement with their associated lock pins, an actuator 60 is provided which is also supported for rotation by the pivot pin 48. The actuator 60 includes an upstanding handle portion 62 and an outwardly projecting tab 64 which extends into an area below pivot pin 48 and adjacent downwardly projecting sections 66 and 68 respectively formed with the hook members 44 and 46.

It will be noted that hook members 44 and 46 are provided with stop tabs 70 and 72, respectively, each of which projects laterally outwardly and serves as an abutment for the handle portion 62 when the latter is moved about the pivot pin 48. In addition, as seen in FIG. 2, the rear of hinge arm 34 is provided with a stop member 74 which abuts a bumper 76 secured to the vehicle for maintaining the seat back 16 in the normal upright seating position.

From the above description, it should be apparent that, as seen in FIG. 3, by movement of the handle portion 62 in a clockwise direction about the pivot pin 48, the tab 64 engages the section 66 and causes the hook member 44 to move clockwise to the phantom line position against the bias of the torsion spring 54 and out of engagement with the lock pin 50. At such time, the seat back 16 is released from locking engagement with the vehicle and when a forwardly directed force is applied to the upper rear end of the seat back 16, the latter will pivot forwardly about the axis B to the phantom line position of FIG. 4. In this position of the seat back 16, the rear lower edge of the seat back is substantially aligned with the wall 22 so as to provide sufficient space for a passenger to gain access to the rear seat assembly 14.

On the other hand, when the handle portion 62 is rotated counterclockwise about the pivot pin 48, the tab 64 engages the section 68 of the hook member 46 causing it to move to the phantom line position as seen in FIG. 2, and out of engagement with the lock pin 52. This results in the seat back 16 being unlocked from the upper end of the hinge arm 34 so that a forwardly directed force on the rear of the seat back 16 will cause the latter to pivot forwardly about axis A and assume the phantom line position shown in FIG. 2. This latter position permits the back surface of the seat back 16 to serve as cargo space.

Various changes and modifications can be made in this construction without departing from the spirit of the invention. Such changes and modifications are contemplated by the inventors and they do not wish to be limited except by the scope of the appended claims.

We claim:

1. A seat assembly for a vehicle including a seat back and a seat cushion wherein said seat back is adapted to be folded forwardly about a first axis extending transversely to the longitudinal center axis of the vehicle so as to provide a flat cargo platform and adapted to be folded forwardly relative to the seat cushion about a second axis which is angularly related to and intersects said first axis at a point located adjacent said longitudinal center axis so as to provide access space for a passenger entering the rear of the vehicle, means located at said point of intersection of said first and second axes for universally connecting one side of the seat back to the vehicle, a hinge arm located adjacent the other side of said seat back and having an upper end and a lower end with the lower end of said hinge arm being pivotally connected to said vehicle along said second axis, means located along said first axis for pivotally connecting an intermediate portion of said hinge arm to said seat back, and the upper end of said hinge arm being provided with a latch mechanism adapted to selectively unlock and lock the upper end of said hinge arm to said seat back whereby the latter will move about the first and second axes respectively when pivoted forwardly.

2. A seat assembly for a vehicle including a seat back and a seat cushion wherein said seat back is adapted to be folded forwardly about a first axis extending transversely to the longitudinal center axis of the vehicle so as to overlie said seat cushion and provide a flat cargo platform and adapted to be folded forwardly relative to the seat cushion about a second axis which is angularly related to and intersects said first axis at a point located adjacent said longitudinal center axis so as to provide access space for a passenger entering the rear of the vehicle, a swivel joint located at said point of intersection of said first and second axes for joining one side of the seat back to the vehicle, said swivel joint comprising an upstanding bracket secured to the vehicle, said bracket having a round hole formed therein, a curved pin having one end fixed to said one side of the seat back and the other end located within said hole, a hinge arm located adjacent the other side of said seat back and having an upper end and a lower end with the lower end of said hinge arm being pivotally connected to said vehicle along said second axis, means located along said first axis for pivotally connecting an intermediate portion of said hinge arm to said seat back, and the upper end of said hinge arm being provided with a latch mechanism adapted to selectively unlock and lock the upper end of said hinge arm to said seat back whereby the latter will move about the first and second axes respectively when pivoted forwardly.

3. A seat assembly for a vehicle including a seat back and a seat cushion wherein said seat back is movable forwardly about a first pivot axis extending transversely to the longitudinal center axis of the vehicle so as to overlie said seat cushion and provide a flat cargo platform and movable forwardly relative to the seat cushion about a second pivot axis which is angularly related to and intersects said first pivot axis at a point located adjacent said longitudinal center axis so as to provide access space for a passenger entering the rear of the vehicle, a swivel joint located at said point of intersection of said first and second pivot axes for universally connecting one side of the seat back to the vehicle, an L-shaped hinge arm located adjacent the other side of said seat back and having an upper end and a lower end, means pivotally connecting the lower end of said hinge arm to said vehicle along said second axis, means located along said first axis for pivotally connecting an intermediate portion of said hinge arm to said seat back, the upper end of said hinge arm being provided with a latch mechanism adapted to selectively unlock and lock the upper end of said hinge arm to said seat back whereby the latter will move about the first and second axes respectively when pivoted forwardly, said latch mechanism comprising a pair of hook members pivotally connected to said upper end of the hinge arm by a common pivotal connection, pin means rigidly secured to said seat back and the vehicle for locking engagement with said hook members, a torsion spring biasing said hook members into latched position with said pin means and an actuator carried by said common pivotal connection for selectively releasing each of said hook members.

* * * * *